US011979748B2

(12) United States Patent
Shah et al.

(10) Patent No.: US 11,979,748 B2
(45) Date of Patent: May 7, 2024

(54) SECURITY MONITORING FOR WIRELESS COMMUNICATION DEVICES

(71) Applicant: Verizon Patent and Licensing Inc., Basking Ridge, NJ (US)

(72) Inventors: Anand J. Shah, Parsippany, NJ (US); Hans Raj Nahata, New Providence, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 93 days.

(21) Appl. No.: 17/493,354

(22) Filed: Oct. 4, 2021

(65) Prior Publication Data

US 2022/0030433 A1 Jan. 27, 2022

Related U.S. Application Data

(63) Continuation of application No. 16/268,824, filed on Feb. 6, 2019, now Pat. No. 11,159,943.

(51) Int. Cl.
| | |
|---|---|
| *H04L 29/06* | (2006.01) |
| *G06F 16/955* | (2019.01) |
| *H04L 9/40* | (2022.01) |
| *H04W 12/121* | (2021.01) |
| *G06N 20/00* | (2019.01) |

(52) U.S. Cl.
CPC ...... *H04W 12/121* (2021.01); *G06F 16/9566* (2019.01); *H04L 63/1416* (2013.01); *G06N 20/00* (2019.01)

(58) Field of Classification Search
CPC ............... H04L 63/101; H04L 63/1416; G06F 16/9566; H04W 12/121
See application file for complete search history.

(56) References Cited

U.S. PATENT DOCUMENTS

| | | | | |
|---|---|---|---|---|
| 2008/0103886 | A1* | 5/2008 | Li | G06Q 30/02 |
| | | | | 705/14.71 |
| 2010/0094860 | A1* | 4/2010 | Lin | G06Q 30/0277 |
| | | | | 707/804 |
| 2012/0158626 | A1 | 6/2012 | Zhu et al. | |
| 2014/0033307 | A1* | 1/2014 | Schmidtler | H04L 63/1483 |
| | | | | 726/22 |
| 2014/0201841 | A1* | 7/2014 | Deshpande | G06Q 20/3224 |
| | | | | 726/25 |
| 2017/0048273 | A1* | 2/2017 | Bach | H04L 51/212 |
| 2018/0007003 | A1* | 1/2018 | Hodgman | H04L 63/1425 |
| 2018/0007054 | A1 | 1/2018 | Els et al. | |
| 2018/0053215 | A1* | 2/2018 | e Costa | G06Q 30/0267 |
| 2019/0068554 | A1* | 2/2019 | Austin | H04L 63/101 |

* cited by examiner

*Primary Examiner* — Jeffrey C Pwu
*Assistant Examiner* — Thong P Truong

(57) ABSTRACT

A computer device may include a memory configured to store instructions and a processor configured to execute the instructions to receive a request from a user equipment (UE) device to resolve a Domain Name System (DNS) query for a Uniform Resource Locator (URL) and determine that the URL corresponds to a malicious URL. The processor may be further configured to select to not resolve the DNS query in response to determining that the URL corresponds to a malicious URL and send an indication to the UE device that the URL corresponds to a malicious URL.

20 Claims, 10 Drawing Sheets

SECURITY MONITORING FOR WIRELESS COMMUNICATION DEVICES

CROSS-REFERENCE TO RELATED APPLICATIONS

This patent application is a continuation of U.S. patent application Ser. No. 16/268,824, filed on Feb. 6, 2019, and titled "SECURITY MONITORING FOR WIRELESS COMMUNICATION DEVICES," the contents of which are hereby incorporated by reference in their entirety.

BACKGROUND INFORMATION

Wireless communication services continue to improve and expand the available services as well as networks used to deliver such services. One aspect of such improvements includes the development of wireless access networks as well as options to utilize such wireless access networks. Network providers may manage a large number of wireless access networks and a particular wireless access network may manage a large number of devices. A wireless communication device may access various resources on the Internet that may compromise the security of the wireless communication device.

DETAILED DESCRIPTION OF PREFERRED EMBODIMENTS

Figure 1:
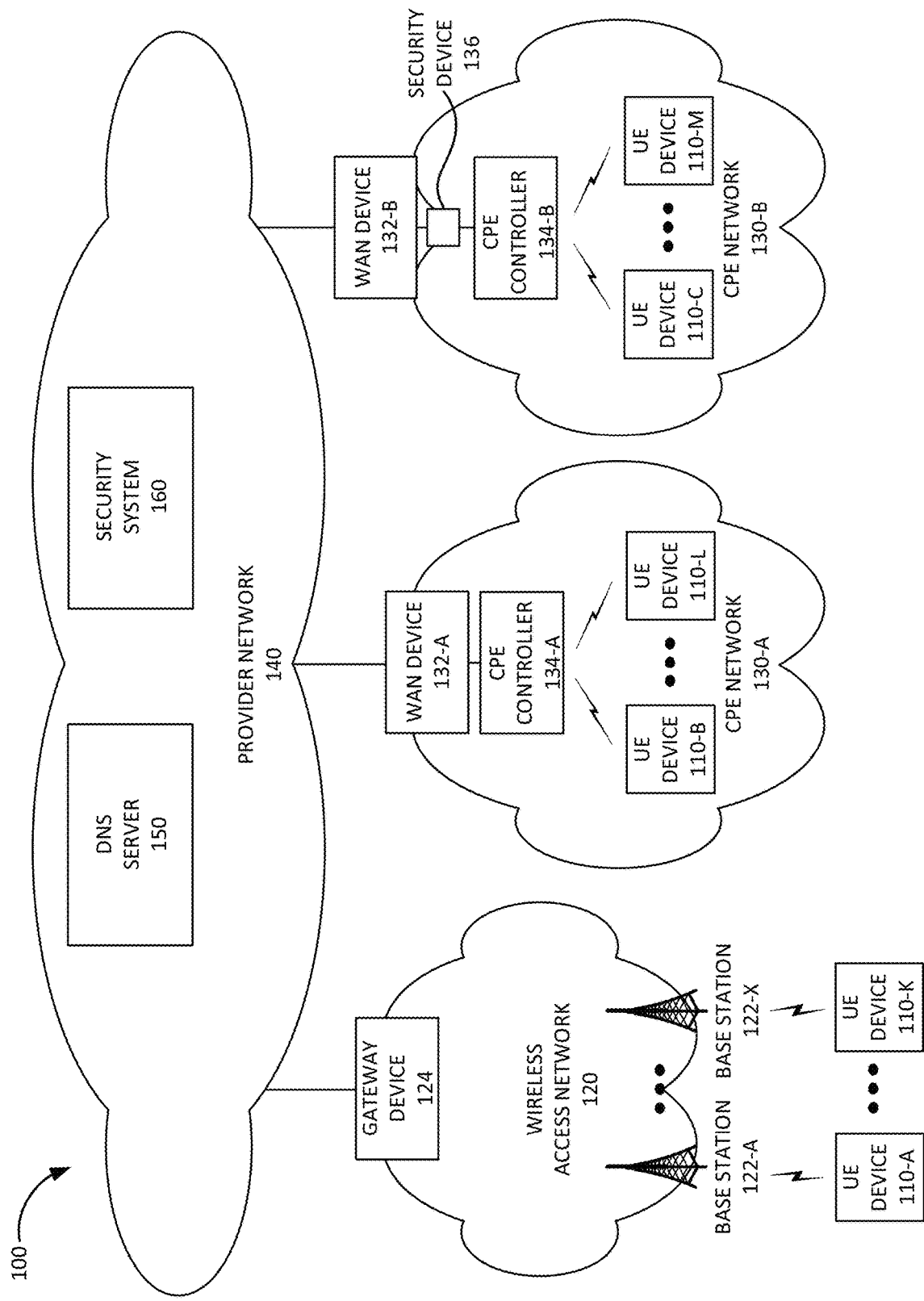
FIG. 1 is a diagram illustrating an environment according to an implementation described herein.

The following detailed description refers to the accompanying drawings. The same reference numbers in different drawings identify the same or similar elements.

Wireless communication devices, such as smart phones or tablet computer devices, are being used by consumers for an increasing number of different tasks or applications. As the number of wireless communication devices in use continues to increase, along with an increasing number of uses to which the wireless communication devices are being put by consumers, the number of potential security threats and concerns associated with wireless communication devices continues to rise as well. A user of a wireless communication device may face various security threats, such as identity theft, extortion, malware, phishing attacks, Trojan horses, dolphin attacks (e.g., hidden ultrasonic commands in online videos, etc.), ransomware, and/or other types of security threats.

Implementations described herein relate to a security application provided to, and/or installed on, a wireless communication device. The security application may provide security services for the wireless communication device. The provided security services may include generating a security risk score for a user of the wireless communication device based on demographic information, browsing history, and/or application use associated with the user, providing a security news feed along with recommendations for actions to take based on news items included in the security news feed, monitoring applications installed on the wireless communication device for violations of a security policy, monitoring an operating system installed on the wireless communication device for violations of the security policy, performing advertisement blocking based on an advertisement blocking setting associated with the wireless communication device, performing identity theft monitoring for the user associated with the wireless communication device, providing password management for the user associated with the wireless communication device, providing a Virtual Private Network (VPN) service, and/or providing other types of security services for the wireless communication device.

Furthermore, the security application may intercept all requests to access content via a hyperlink by a browser and/or any application or process running on the wireless communication device. A hyperlink may identify a Uniform Resource Locator (URL). A URL may include a domain name and a file path that identifies the location of the content referenced by the hyperlink. In order to identify the address associated with the URL, a browser application or another application requesting the content may need to identify an Internet Protocol (IP) address associated with the URL by sending a Domain Name System (DNS) query to a DNS server. The DNS server may resolve the DNS query by identifying the IP address associated with the URL and providing the identified IP address to the wireless communication device.

The security application may be configured to intercept a request to resolve a DNS query for a URL, send a DNS query request to a DNS server managed by a provider that provides wireless communication service for the wireless communication device, receive, from the DNS server, an indication to the wireless communication device that the URL corresponds to a malicious URL, generate a warning, to be displayed in a user interface, indicating that the URL corresponds to a malicious URL, and take action to avoid a security incident, such as preventing the wireless communication device from accessing a malicious site, such as a phishing site, blocking a redirect to a malicious site, preventing malicious executable content from being downloaded to the wireless communication device, and/or other types of security incidents.

In some implementations, the security application may be installed and run on a wireless communication device. In other implementations, the security application may be installed and run on a network device in a communication path between the wireless communication device, or another type of user device, and a DNS server. As an example, the security application may be installed on a gateway network device, such as, for example, a Packet Data Network Gateway (PGW) in a Fourth Generation (4G) Long Term Evolution (LTE) network or a gateway device in a Fifth Generation (5G) network, such as a User Plane Function (UPF)

device. As another example, the security application may be installed on a WiFi access point (AP) in a customer premises equipment (CPE) network in which the WiFi AP is managed by a provider of communication services. In yet other implementations, the security application may be installed and run on a security dongle, associated with the provider of communication services, in a CPE network that is not managed by the provider.

The provider associated with the network device may provide DNS monitoring as a service. For example, a security application installed on the network device may intercept a DNS query for a URL from a user device, determine that the user device is subscribed to the DNS monitoring service, and send the DNS query to the DNS server managed by the provider of the DNS monitoring service in response to determining that the user device is subscribed to the DNS monitoring service.

Moreover, the security application installed on the network device may provide additional services, such as account monitoring. For example, if a user's subscription is associated with multiple devices, such as a family subscription, the user device designated as the account manager device for the subscription may be able to monitor the activity of the other user devices associated with the subscription. Thus, a parent's user device, designated as the account manager device, may receive a notification if a child's user device is exposed to a security risk, such as visiting, or attempting to visit, a suspected malicious website.

Furthermore, in some implementations, one or more of the functions performed by the security application, or particular aspects of a particular function performed by the security application, may be performed by one or more devices in the cloud. As an example, a machine learning model used for a security function may be implemented via edge computing, such as by running the machine learning model on a base station edge computing device and/or a regional server device. The machine learning model may be trained using supervised learning, unsupervised learning, reinforcement learning, or a combination thereof.

Implementations described herein further relate to a DNS server managed by a provider of communication services that monitors DNS query requests to identify malicious URLs. A malicious URL may include a URL that launches a phishing attack to obtain personal and/or security information for a user; installs malware, a virus, and/or a trojan horse program; redirects the user to a malicious web site; and/or performs another type of action that compromises the security of a wireless communication device or another type of computer device associated with a user.

The DNS server may be configured to receive a request from a wireless communication device to resolve a DNS query for a URL and determine whether the URL corresponds to a malicious URL. If the DNS server determines that the URL corresponds to a malicious URL, the DNS server may select to not resolve the DNS query in response to determining that the URL corresponds to a malicious URL and send an indication to the user device that the URL corresponds to a malicious URL.

The user of the wireless communication device may select to proceed with resolving the DNS query despite the warning. In such a case, the DNS server may receive a request from the wireless communication device to proceed with resolving the DNS query, resolve the DNS query to identify an IP address associated with URL, in response to receiving the request from the wireless communication device to proceed with resolving the DNS query, and provide the identified IP address to the wireless communication device.

In some implementations, determining that the URL corresponds to a malicious URL may include accessing a malicious URL database that stores a list of identified malicious URLs. In some implementations, determining that the URL corresponds to a malicious URL may include receiving an indication from another wireless communication device identifying the URL as a malicious URL and adding the URL to the malicious URL database, in response to receiving the indication from the other wireless communication device.

In some implementations, determining that the URL corresponds to a malicious URL may include providing the URL as an input to a machine learning model trained to identify malicious URLs. For example, the DNS server may generate an input feature vector from the URL based on one or more of lexical features associated with the URL, location features associated with the URL, and user device use features associated with the URL, and may provide the input feature vector to the machine learning model to generate a prediction as to whether the input feature vector corresponds to an input feature vector for a malicious URL.

Furthermore, in some implementations, the DNS server may be configured to perform advertisement blocking for a wireless communication device based on an advertisement blocking setting associated with the wireless communication device. For example, the DNS server may receive a request from a wireless communication device to resolve a DNS query for a URL, determine that the wireless communication device has selected an advertisement blocking setting, determine that the URL is associated with an advertisement, and select to not resolve the other DNS query in response to determining that the other URL is associated with an advertisement and that the wireless communication device has selected an advertisement blocking setting.

In some implementations, determining that the URL is associated with an advertisement may include accessing an advertisement URL database that stores a list of identified advertisement URLs. Furthermore, in some implementations, determining that the URL is associated with an advertisement may include providing the URL as an input to a machine learning model trained to identify advertisement URLs.

Intercepting DNS query requests, determining whether a URL associated with an intercepted DNS query request corresponds to a malicious link, and selecting to not resolve the DNS query of the URL corresponding to a malicious link may improve the functioning of a wireless communication device by, for example, preventing installation of malware on the wireless communication device, since malware may slow down the operation of the wireless communication device, cause the wireless communication device to malfunction, and/or consume processor, memory, storage, and/or network bandwidth resources of the wireless communication device.

Furthermore, by intercepting malicious URLs at the DNS query stage, the security of the wireless communication device may be improved in comparison to other types of intervention to prevent the influence of malicious URLs, since by not resolving the DNS request, the wireless communication device never receives an IP address associated with a malicious URL and is therefore never able to access the malicious content associated with the malicious URL.

FIG. 1 is a diagram of an exemplary environment 100 in which the systems and/or methods, described herein, may be implemented. As shown in FIG. 1, environment 100 may include a wireless access network 120, a first customer premises equipment (CPE) network 130-A, a second CPE network 130-B, and a provider network 140.

Wireless access network 120 may provide wireless access to provider network 140 for user equipment (UE) devices 110-A to 110-K (referred to herein collectively as "UE devices 110" and individually as "UE device 110"). UE device 110 may include any device with long-range (e.g., cellular or mobile wireless network) wireless communication functionality. Additionally, UE device 110 may include short-range wireless communication functionality, such as WiFi and/or Bluetooth™ functionality. UE device 110 may include a security application managed by the provider of communication services. The security application may provide security services as described herein, including intercepting DNS query requests and sending any intercepted DNS query requests to DNS server 150 associated with the provider.

For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a set-top box or a digital media player (e.g., Apple TV, Google Chromecast, Amazon Fire TV, etc.); a smart television; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may include an Internet of Things (IoT) device that communicates using machine-to-machine (M2M) communication, such as machine-type communication (MTC), a type of M2M communication standardized by the 3rd Generation Partnership Project (3GPP), and/or another type of M2M communication. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), a telematics device in a vehicle, an autonomous vehicle, an unmanned aerial vehicle, and/or another type of electronic device.

Wireless access network 120 may include a Radio Access Network (RAN) that includes base stations 122-A to 122-X (referred to herein collectively as "base stations 122" and individually as "base station 122") and a core network that includes gateway device 124. In some implementations, the core network may include a Long Term Evolution (LTE) access network (e.g., an evolved packet core (EPC) network). In other implementations, wireless access network 120 may include a Code Division Multiple Access (CDMA) access network. For example, the CDMA access network may include a CDMA enhanced High Rate Packet Data (eHRPD) network (which may provide access to an LTE access network).

Furthermore, wireless access network 120 may include an LTE Advanced (LTE-A) access network and/or a Fifth Generation (5G) access network or other advanced network that includes functionality such as carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Base station 122 may include a 4G base station (e.g., an eNodeB) and/or a 5G base station (e.g., a gNodeB). Base station 122 may include one or more cells that include devices and/or components configured to enable wireless communication with UE devices 110. For example, each cell may include a radio frequency (RF) transceiver facing a particular direction. A 4G base station may be configured to communicate with UE devices 110 using a 4G LTE air interface. A 5G base station may be configured to communicate with UE devices 110 using a 5G New Radio (NR) air interface. For example, base station 122 may include one or more antenna arrays configured to send and receive wireless signals in the millimeter (mm) wave frequency range. Furthermore, base station 122 may include one or more edge computing devices configured to perform cloud computing for UE devices 110 serviced by base station 122.

Gateway device 124 may include a network device that functions as a gateway to provider network 140 and/or another network reachable via provider network 140. While a single gateway device 124 is shown in FIG. 1 for illustrative purposes, in practice, wireless access network 120 may include multiple, and possibly a large number of, gateway devices 124. If wireless access network 120 includes a 4G core network, gateway device 124 may include a Packet Data Network Gateway (PGW) device. If wireless access network 120 includes a 5G core network, gateway device 124 may include a User Plane Function (UPF) device. A particular UE device 110 may be configured to communicate with multiple gateway devices 124, one for each packet network with which UE device 110 communicates. For example, a particular gateway device 124 may be associated with a particular Access Point Name (APN) and UE device 110 may connect to the particular APN via the particular gateway device 124. Furthermore, wireless access network 120 may enable UE device 110 to communicate with an application server, and/or another type of device, located in provider network 140 using a communication method that does not require the establishment of an IP connection between UE device 110 and provider network 140, such as, for example, Data over Non-Access Stratum (DoNAS).

CPE network 130-A may include a Layer 2 and/or Layer 3 local area network (LAN) associated with a customer's premises. CPE network 130-A may be located at or within a residential home, in an apartment building, in a school, in a commercial office building, in a shopping mall, in a connected mass transit vehicle (e.g., bus, train, plane, boat, etc.), and/or in another type of location associated with a customer of a provider of telecommunication services. CPE network 130-A may include UE devices 110-B to 110-L, a CPE controller 134-A, and a wide area network (WAN) device 132-A. CPE network 130-A may be managed, at least in part, by a provider of communication services, such as a provider managing wireless access network 120 and/or provider network 140. For example, the provider may enable CPE network 130-A to connect to provider network 140 via a managed network device, such as WAN device 132-A and/or CPE controller 134-A.

CPE network 130-A may receive one or more services via a wireless connection between a WAN device 132-A and provider network 140, such as, for example, a television service, Internet service, and/or voice communication (e.g., telephone) service. For example, CPE network 130-A may be implemented as a gigabit network that enables gigabit speed connections.

WAN device 132-A may interface CPE network 130-A to a WAN, such as provider network 140, via a wired and/or wireless connection. As an example, WAN device 132-A may include an optical network terminal (ONT). An ONT may connect to provider network 140 via an optical fiber and may function as a gateway device to Gigabit Passive Optical Network (GPON) or a GPON2 located in provider network 140. As another example, WAN device 132-A may connect to provider network 140 via a wired electrical connection, such as a coaxial cable. As yet another example, WAN device 132-A may include a wireless transceiver configured to communicate with provider network 140 via a wireless access network 120.

CPE controller 134-A may include a layer 2 and/or layer 3 network device, such as a switch, router, firewall, and/or gateway and may support different types of interfaces, such as an Ethernet interface, a WiFi interface, a Multimedia over Coaxial Alliance (MoCa) interface, and/or other types of interfaces. CPE controller 134-A may additionally function as a WiFi AP using a transceiver configured to communicate with UE devices 110 using WiFi signals based on the Institute of Electrical and Electronics Engineers (IEEE) 802.11 standards for implementing a wireless LAN network. UE devices 110-A to 110-L may communicate with CPE controller 134-A using WiFi signals.

CPE controller 134-A may include a security application managed by the provider of communication services. The security application may provide security services as described herein, including intercepting DNS query requests, generated by UE devices 110-B to 110-L in CPE network 130-A, and sending any intercepted DNS query requests to DNS server 150 associated with the provider.

In some implementations, gateway device 124, WAN device 132, and/or CPE controller 134 may include a security application that provides security services as described herein, such as, for example, intercepting DNS query requests and sending any intercepted DNS query requests to DNS server 150 associated with the provider and/or an account monitoring service to send security alerts relating to UE devices 110 associated with an account to an account manager UE device 110.

CPE network 130-B may include a Layer 2 and/or Layer 3 LAN associated with another customer's premises. CPE network 130-B may be managed by a second provider of communication services (e.g., different from the first provider that manages wireless access network 120, CPE network 130-A, and/or provider network 140. CPE network 130-B may include UE devices 110-C to 110-M, a CPE controller 134-B, a WAN device 132-B, and a security device 136. Security device 136 may include a dongle between CPE controller 134-B and WAN device 132-B that includes a computer device with a security application managed by the first provider of communication services. The security application may provide security services as described herein, including intercepting DNS query requests, generated by UE devices 110-A to 110-M in CPE network 130-B, and sending any intercepted DNS query requests to DNS server 150 associated with the first provider.

Provider network 140 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of provider network 140 may be managed by a provider of communication services that also manages wireless access network 120, CPE network 130-A, and/or security device 136. Provider network 140 may allow the delivery of Internet Protocol (IP) services to UE devices 110, and may interface with other external networks to enable UE device 110 to connect to the other external networks. In some implementations, provider network 140 may include an IP Multimedia Sub-system (IMS) network (not shown in FIG. 1). An IMS network may include a network for delivering IP multimedia services and may provide media flows between UE devices 110 and external IP networks or external circuit-switched networks (not shown in FIG. 1). Provider network 140 may include a DNS server 150 and a security system 160.

DNS server 150 may include one or more devices, such as computer devices and/or server devices, which resolve DNS queries for UE devices 110 and/or other devices that include a security application, such as CPE controller 134 and/or security device 136. DNS server 150 may maintain a database of URLs that matches particular URLs with particular IP addresses and may return an IP address corresponding to a URL associated with a DNS query. DNS server 150 may further determine whether a URL associated with a DNS query corresponds to a malicious URL and may select to not resolve a DNS query if the DNS query is associated with a malicious link. Furthermore, DNS server 150 may perform advertisement blocking for a user and may select to not resolve a DNS query if the DNS query is associated with an advertisement URL.

Security system 160 may include one or more devices, such as computer devices and/or server devices, which manage a security application installed and/or running on UE device 110, CPE controller 134, and/or security device 136. For example, security system 160 may provide the security application to UE device 110, CPE controller 134, and/or security device 136, may provide updates for the security application, and/or may perform cloud computing for the security application. Furthermore, security system 160 may interface with other devices that provide security services for the security application. For example, security system 160 may interface the security application with a device or system that provides identity protection and monitoring services, may interface with one or more devices or systems that publish security news, etc.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
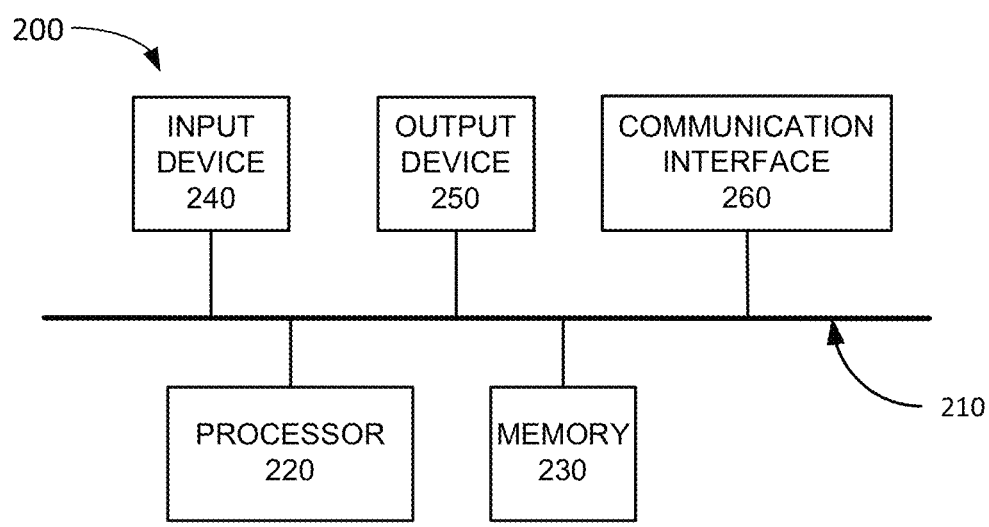
FIG. 2 is a diagram illustrating exemplary components of a device that may be included in a device of FIG. 1.

FIG. 2 is a diagram illustrating example components of a device 200 according to an implementation described herein. UE device 110, base station 122, gateway device 124, WAN device 132, CPE controller 134, security device 136, DNS server 150, and/or security system 160 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, central processing unit (CPU), graphics processing unit (GPU), tensor processing unit (TPU), and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver and one or more antennas that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to performing security functions for UE device 110, including processing of DNS queries. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
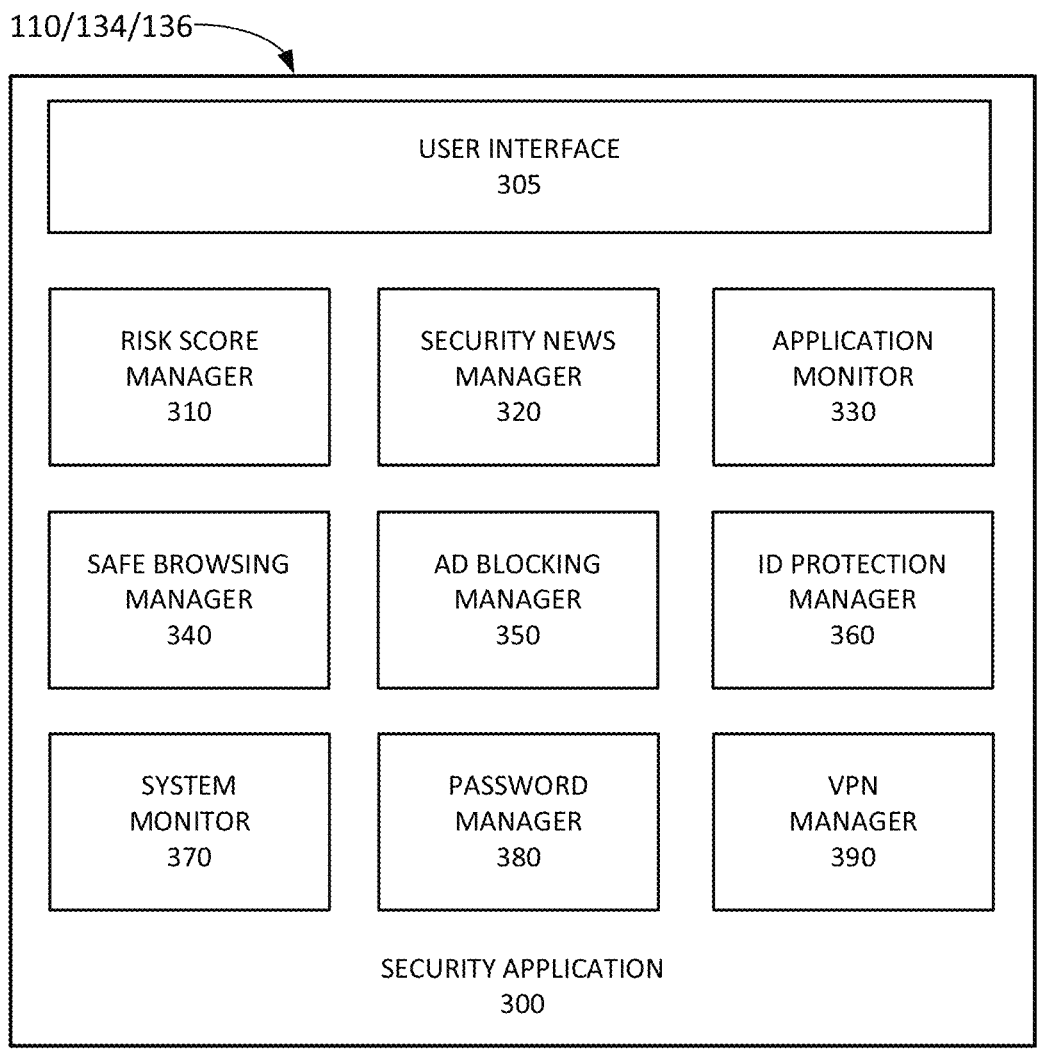
FIG. 3 is a diagram illustrating exemplary components of a user equipment (UE) device or another device of FIG. 1.

FIG. 3 is a diagram illustrating exemplary components of a security application 300 that may be included in UE device 110, CPE controller 134, and/or security device 136. The components of security application 300 may be implemented, for example, via processor 220 executing instructions from memory 230. Alternatively, some or all of the components included in security application 300 may be implemented via hard-wired circuitry. As shown in FIG. 3, security application 300 may include a user interface 305, a risk score manager 310, a security news manager 320, an application monitor 330, a safe browsing manager 340, an advertisement (ad) blocking manager 350, an identity (ID) protection manager 360, a system monitor 370, a password manager 380, and a VPN manager 390.

In some implementations, security application 300 may correspond to a distributed application. Thus, particular functionality of security application 300 may be implemented via cloud computing in, for example, base station 122, gateway device 124, CPE controller 134, WAN device 132, security system 160, and/or another type of device, such as a regional server device. For example, an instance of security application 300 running on UE device 110 may communicate with an instance of security application 300 running on an edge computing device associated with base station 122. As an example, if the instance of security application 300 running on UE device 110 needs to perform a computationally intense task, such as using or updating a machine learning model, the instance of security application 300 running on UE device 110 may delegate the task to the instance of security application 300 running on the edge computing device. As another example, some components of security application 300 may run on UE device 110 and other components of security application 300 may run on the edge computing device.

User interface 305 may generate a user interface on a display device of UE device 110. User interface 305 may provide information to the user of UE device 110 relating to the security of UE device 110. Furthermore, the user of UE device 110 may select to perform particular actions relating to the security of UE device 110 via user interface 305.

Risk score manager 310 may generate a security risk score for a user of UE device 110. Risk score manager 310 may obtain, with the user's permission, demographic information associated with the user, such as, for example, the geographic area associated with the user, the number of subscriber lines associated with the user, the number of children associated with the user, and/or other types of demographic information that may have relevance to determining a security risk. Furthermore, risk score manager 310 may obtain, with the user's permission, information relating to the browsing history for the user and/or information relating to application use associated with the user, such as which applications are installed on UE device 110 and/or how often the user uses particular applications. Risk score manager 310 may generate a security risk score based on the demographic information, browsing history information, and/or application use information using a model that applies a particular weight to each type of information. The security risk score may inform the user to how much security risk UE device 110 associated with the user is exposed.

In some implementations, the security risk score may be computed using a machine learning model trained to generate a security risk score based on a set of demographic parameters and/or user behavior parameters that have been determined to have relevance for determining the security risk for a user's account/subscription. For example, the machine learning model may be trained on, and take as inputs, the geographic location of the user, the number of UE devices 110 associated with the user's account/subscription, the number and/or age of adults and/or children associated with the user's account/subscription, the particular websites visited by UE devices 110 associated with the account/subscription, the particular applications used by UE devices 110 associated with the account/subscription, whether UE devices 110 associated with the account/subscription are password protected, password strength scores associated with the account/subscription UE devices 110, whether UE devices 110 associated with the account/subscription are kept in a secure location or used in public spaces, and/or other parameters that may affect the security of UE devices 110 associated with the user's account/subscription.

Security news manager 320 may provide a security news feed along with recommendations for actions to take based on news items included in the security news feed. For example, security news manager 320 may receive published news releases collected by security system 160 and may provide the news releases to the user via user interface 305. For example, if hackers breach user accounts at a particular website, security news manager 320 may display a message via user interface 305 informing the user of the security breach. Moreover, security news manager 320 may provide a recommendation to the user based on a particular security news item. For example, security news manager 320 may provide a recommendation to the user to change a password for the particular website associated with the security breach. Furthermore, security news manager 320 may determine which applications are used by the user and/or websites visited by the user, and may customize the news alert feed based on the applications used and/or websites visited by the user. For example, if the user visited a particular website and the particular website experienced a security breach, security news manager 320 may send an alert to the user, informing the user of the security breach associated with the particular website.

Application monitor 330 may monitor applications installed and/or running on UE device 110 for violations of a security policy associated with UE device 110. For example, application monitor 330 may monitor all applications, as well as all access points on, UE device 110. The access points may include, for example, the contacts, photos, videos, documents, and/or other types of contents stored on UE device 110 that may be accessed by applications. Application monitor 330 may monitor and record when a particular application accesses a particular access point and/or when a particular application selects to access content, or send information to, another device across a network. For example, application monitor 330 may keep a list of all IP addresses to which a particular application has sent a request.

Safe browsing manager 340 may manage secure browsing for UE device 110. Safe browsing manager 340 may intercept requests by a browsing application, and/or another type of application running on UE device 110, to resolve DNS queries for URLs and may, in response, send DNS query requests to DNS server 150. DNS server 150 may resolve a DNS query for a URL by returning an IP address corresponding to the URL or may return an indication that the URL corresponds to a malicious URL. Safe browsing manager 340 may generate a warning, to be displayed in user interface 305, if DNS server 150 detects a malicious URL. The user may be provided with an option to abort the DNS query or to proceed to resolve the DNS query.

Ad blocking manager 350 may perform advertisement blocking based on an advertisement blocking setting associated with UE device 110. For example, the user associated with UE device 110 may select to block particular types of advertisements (e.g., pop-up advertisements, advertisements with audio, video advertisements, etc.), select to block advertisements associated with a particular website or domain, select to block advertisements associated with a particular product, company, or service, select to block advertisements when UE device 110 is in a particular location, select to block advertisements during a particular time period, and/or select another type of advertisement blocking setting. Ad blocking manager 350 may provide the selected advertisement blocking setting to DNS server 150 and DNS server 150 may select to not resolve a DNS query if the DNS query is associated with a URL that is determined by DNS server 150 to correspond to an advertisement URL.

ID protection manager 360 may perform identity theft monitoring for the user associated with UE device 110. For example, ID protection manager 360 may be configured to communicate, via security system 160 or directly, with a device associated with an identity theft monitoring service. If the identity theft monitoring service detects an event associated with the user's identity, the identity theft monitoring service may send an alert to ID protection manager 360 and ID protection manager 360 may generate an alert to be displayed via user interface 305.

System monitor 370 may monitor an operating system installed on UE device 110 for violations of the security policy. For example, system monitor 370 may monitor whether UE device 110 has been updated with all available updates, whether UE device 110 has been rooted or jailbroken, and/or may monitor for other types of security risks associated with the operating system of UE device 110. Furthermore, system monitor 370 may perform account monitoring for other UE devices 110 associated with the user's account/subscription. If a user's subscription is associated with multiple UE devices 110, such as a family subscription, UE device 110 designated as the account manager device for the subscription may be able to monitor the activity of the other UE devices 110 associated with the subscription. For example, a parent's UE device 110, designated as the account manager UE device 110, may receive a notification if a child's UE device 110 is exposed to a security risk, such as visiting, or attempting to visit, a malicious website, downloading a malicious application, etc.

Password manager 380 may manage passwords associated with the user of UE device 110. For example, password manager 380 may store passwords associated with the user in an encrypted format and may provide a particular stored password to the user when the user is logging into a particular account. VPN manager 390 may provide a VPN service for the user of UE device 110. For example, a user may select to activate a VPN service and VPN manager 390 may establish a VPN connection to security system 160.

Although FIG. 3 shows exemplary components of security application 300, in other implementations, security application 300 may include fewer components, different components, additional components, or differently arranged components than depicted in FIG. 3. Additionally, or alternatively, one or more components of security application 300 may perform one or more tasks described as being performed by one or more other components of security application 300.

Figure 4:
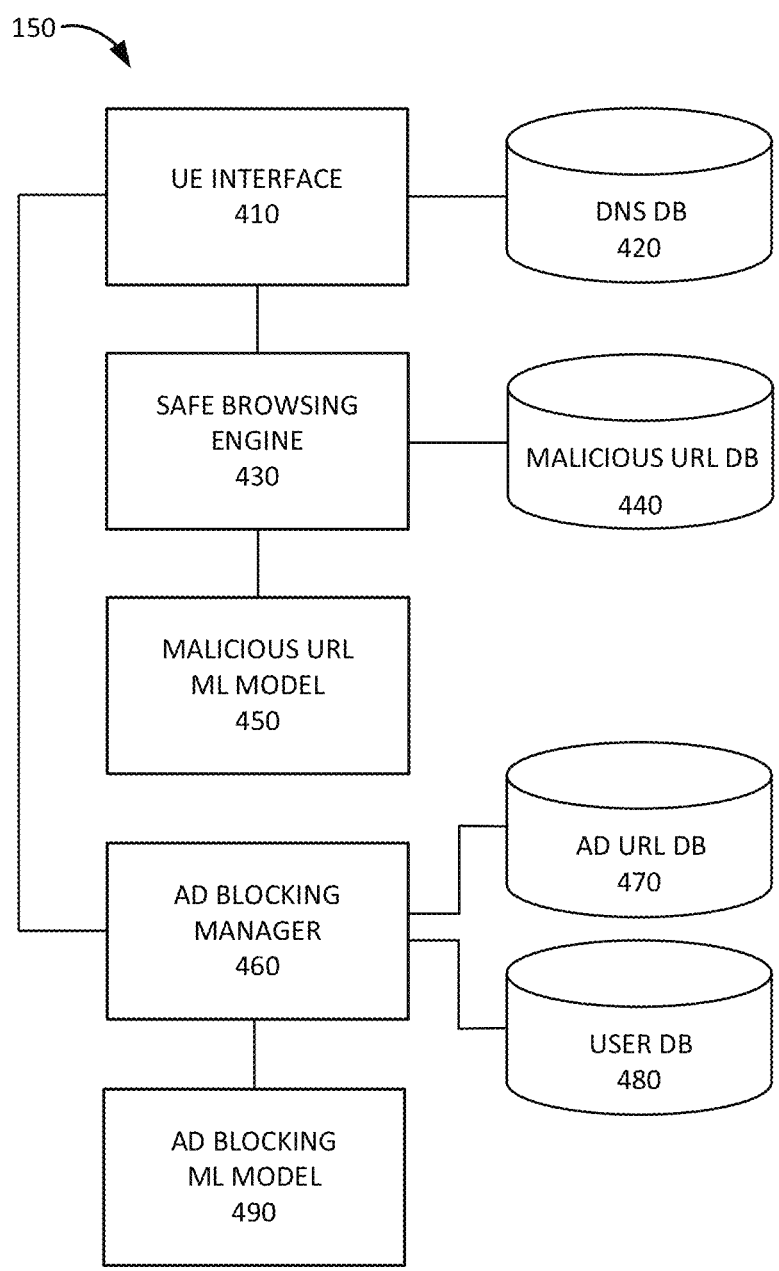
FIG. 4 is a diagram illustrating exemplary components of the Domain Name System (DNS) server of FIG. 1.

FIG. 4 is a diagram illustrating exemplary components of DNS server 150. The components of DNS server 150 may be implemented, for example, via processor 220 executing instructions from memory 230. Alternatively, some or all of the components included in DNS server 150 may be implemented via hard-wired circuitry. As shown in FIG. 4, DNS server 150 may include a security application interface 410, a DNS database (DB) 420, a safe browsing engine 430, a malicious URL DB 440, a malicious URL machine learning (ML) model 450, an ad blocking manager 460, an ad URL DB 470, a user DB 480, and an ad blocking ML model 490.

Security application interface 410 may be configured to communicate with security application 300 running on UE device 110, base station 122, gateway device 124, CPE controller 134, WAN device 132, and/or security device 136. For example, security application interface 410 may establish a secure and/or encrypted connection with UE device 110 before sending information to, and/or receiving information from, UE device 110. Security application interface 410 may be configured to receive a DNS query request from security application 300 to determine an IP address associated with a particular URL. DNS DB 420 may store DNS information. For example, DNS DB 420 may associate particular URLs with particular IP addresses. Security application interface 410 may provide an IP address for a URL associated with a DNS request if the URL is determined to not correspond to a malicious URL.

Safe browsing engine 430 may manage secure browsing for UE device 110. For example, safe browsing engine 430 may determine whether a URL associated with a received DNS request corresponds to a malicious URL. If a URL is determined to correspond to a malicious URL, safe browsing engine 430 may select to not resolve the DNS request associated with the malicious URL. Safe browsing engine 430 may instruct security application interface 410 to send a warning message to UE device 110 indicating that a malicious URL has been detected. Safe browsing engine 430 may not resolve the DNS request associated with the malicious URL unless the user of UE device 110 requests to proceed with resolving the DNS request.

Safe browsing engine 430 may identify malicious URLs based on information stored in malicious URL DB 440 and/or based on output generated by malicious URL machine learning (ML) model 450. Malicious URL DB 440 may store information relating to identified malicious URLs. For example, for each particular identified malicious URL, malicious URL DB 440 may store the particular identified malicious URL, a timestamp identifying when the particular malicious URL was identified, how the particular malicious URL was identified, the type of malicious behavior associated with the particular malicious URL, and/or other types of information associated with the particular malicious URL.

The identified malicious URLs stored in malicious URL DB 440 may be obtained from published and/or publicly available lists of malicious URLs, from malicious URLs identified by UE devices 110, malicious URLs identified by malicious URL ML model 450, and/or obtained using another technique. For example, when security application 300 running on a particular UE device 110 detects malicious activity associated with a URL that has not been previously identified as a malicious URL, security application 300 may report the URL to DNS server 150. As an example, security application 300 may detect malicious activity such as a phishing attack that includes a request for the user's personal information by identifying a particular pattern of words in a message received by the user. As another example, security application 300 may detect a virus, trojan horse, and/or malware code downloaded to and/or stored on UE device 110 based on code patterns of identified virus, trojan horse and/or malware programs maintained by security system 160. In this manner, other UE devices 110 may aid in identifying malicious URLs.

Safe browsing engine 430 may provide as input a URL associated with a DNS query to malicious URL ML model 450. Malicious URL ML model 450 may include a machine learning model trained to classify a URL as a malicious URL or a non-malicious URL. In some implementations, malicious URL ML model 450 may include a deep learning artificial neural network model. In other implementations, malicious URL ML model 450 may include a different type of machine learning model, such as, for example, a linear classifier, a naive Bayesian classifier, a kernel density estimation classifier, a support vector machine classifier, a maximum entropy classifier, a decision tree classifier, a random forest classifier, and/or another type of classifier.

Malicious URL ML model 450 may be trained using a training set of URLs in which each URL has been labeled as either a malicious URL or a non-malicious URL. In some implementations, malicious URL ML model 450 may be trained without performing explicit embedding on the training set URLs before providing the URLs as an input into the ML model. An embedding may map URLs into a vector in a lower dimensional feature space compared to the dimensional space of the URLs. Thus, malicious URL ML model 450 may include a layer of nodes that are trained to perform embedding on the URLs by mapping the URLs to a lower-dimensional feature space. In other words, features associated with malicious URLs that may be used to classify the URLs as malicious may be learned by malicious URL ML model 450 during training.

In other implementations, a URL may be embedded before being input into malicious URL ML model 450. The embedding may map a URL into a feature space in which each dimension is associated with a particular categorical or numerical feature associated with the URL. The features may include lexical features based on the characters and/or words included in a URL. For example, the lexical features may include a length of the URL, a length of the hostname included in the URL, the length of the pathname included in the URL, the number of period characters included in the URL, the URL parameters included in the URL, user agents associated with the URL, Hypertext Transfer Protocol (HTTP) header patterns associated with the URL, and/or other types of lexical features. Furthermore, the lexical features may include a "bag-of-words" encoding in which each word (e.g., delimited by at least one of a selected set of delimiter characters, etc.) that is included in at least one URL in the training set of URLs is one-hot encoded as a binary feature of the embedding. In a one-hot encoding, only one dimension of a set of categorical dimensions is set to 1 for each vector, while the rest of the dimensions are set to 0.

Furthermore, the features may include location-based features for a URL, such as, for example, what geographical region is associated with the URL, what autonomous system is associated with the URL, which country is associated with the URL, which entity registered the domain associated with the URL, and/or other types of location-based features. Moreover, the features may include UE device 110 use features, such as, for example, whether the URL is associated with an application, a particular application associated with the URL, a particular type of application associated with the URL, a particular operating system associated with the URL, and/or other types of UE device use features.

Ad blocking manager 460 may perform advertisement blocking based on an advertisement blocking setting associated with a user of UE device 110. For example, ad blocking manager 460 may access ad URL DB 470 to determine whether a URL associated with a DNS query corresponds to an ad URL. Ad URL DB 470 may store information relating to identified ad URLs. For each particular identified ad URL, ad URL DB 470 may store the particular identified ad URL, a timestamp identifying when the particular ad URL was identified, how the particular ad URL was identified, a type of ad associated with the particular ad URL (e.g., pop-up, audio, video, browser frame, etc.), a category of product or service associated with the particular ad URL, an entity associated with the particular URL, and/or other types of information associated with the particular ad URL.

If ad blocking manager 460 identifies an ad URL, ad blocking manager 460 may access user DB 480 to determine whether to select to not resolve the DNS query associated with the ad URL based on an ad blocking setting associated with the user of UE device 110. If the user is associated with an advertisement blocking setting that applies to the identified ad URL, ad blocking manager 460 may select to not resolve the DNS request associated with the identified ad URL. User DB 480 may store, for a particular UE device 110, one or more types of advertisements to block (e.g., pop-up advertisements, advertisements with audio, video advertisements, etc.), one or more websites or domains for which to block advertisements, a category of product or service for which to block advertisements, a time period during which to block particular types of advertisements, and/or other types of advertisement blocking settings.

Ad blocking manager 460 may further identify ad URLs using ad blocking ML model 480. Ad blocking ML model 490 may include a machine learning model trained to classify a URL as advertisement URL or a non-advertisement URL. In some implementations, ad blocking ML model 490 may include a deep learning artificial neural network model. In other implementations, ad blocking ML model 490 may include a different type of machine learning model, such as, for example, a linear classifier, a naive Bayesian classifier, a kernel density estimation classifier, a support vector machine classifier, a maximum entropy classifier, a decision tree classifier, a random forest classifier, and/or another type of classifier.

Ad blocking ML model 490 may be trained using a training set of URLs in which each URL has been labeled as either an advertisement URL or a non-advertisement URL. Similarly to as described above with respect to malicious URL ML model 450, ad blocking ML model 490 may be trained with explicitly defined embedding features or may be trained to learn embedding features. The embedding features may include lexical features, location-based features, UE device 110 use features, and/or other types of features as described above with respect to malicious URL ML model 450.

Although FIG. 4 shows exemplary components of DNS server 150, in other implementations, DNS server 150 may include fewer components, different components, additional components, or differently arranged components than depicted in FIG. 4. Additionally, or alternatively, one or more components of DNS server 150 may perform one or more tasks described as being performed by one or more other components of DNS server 150.

Figure 5:
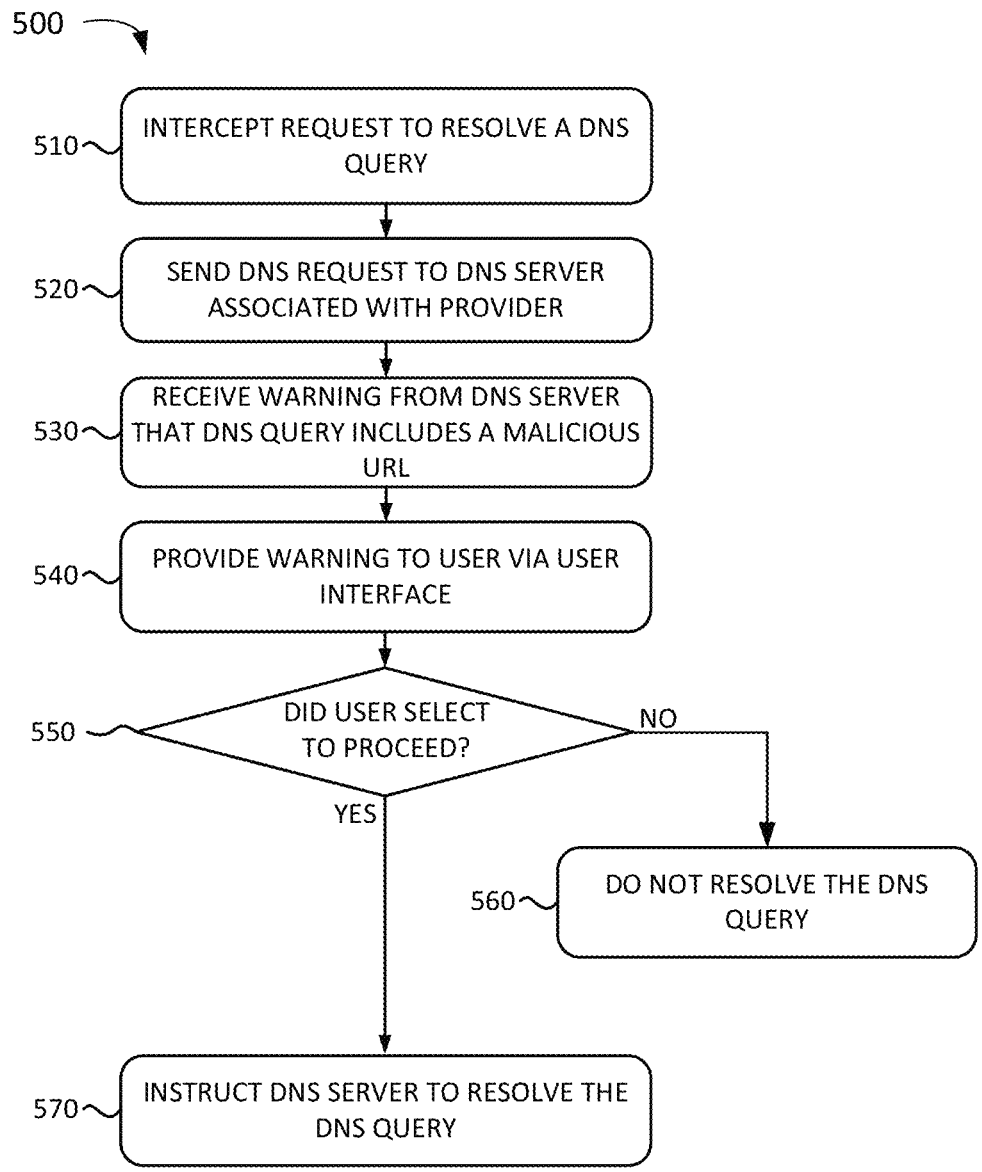
FIG. 5 is a flowchart of a process for handling DNS queries according to an implementation described herein.

FIG. 5 is a flowchart 500 of a first process for handling DNS queries according to an implementation described herein. In some implementations, the process of FIG. 5 may be performed by security application running on UE device 110, base station 122, gateway device 124, CPE controller 134, or security device 136. In other implementations, some or all of the process of FIG. 5 may be performed by another device or a group of devices separate from UE device 110, CPE controller 134, or security device 136, such as, for example, security system 160.

The process of flowchart 500 may include detecting a request to resolve a DNS query (block 510) and sending the DNS request to a DNS server associated with a provider (block 520). For example, security application 300 may intercept any DNS requests generated by UE device 110 and may send the DNS requests to DNS server 150. A warning from a DNS server may be received that indicates that the DNS query includes a malicious link (block 530) and the warning may be provided to the user via a user interface (block 540). For example, DNS server 150 may identify a malicious URL associated with a DNS query and may send a warning to UE device 110.

As another example, security application 300 running on gateway device 124, WAN device 132, or security device 136 may intercept a DNS request from UE device 110 and may determine that UE device 110 is associated with an account/subscription that includes a DNS monitoring service. In response, security application 300 may send the intercepted DNS request to DNS server 150 instead of a default DNS server. If DNS server 150 determines that the DNS query is associated with a malicious URL, security application 300 running on gateway device 124, WAN device 132, or security device 136 may receive a warning from DNS server 150 and forward the warning to UE device 110.

Security application 300 may display the warning on the display device of UE device 110 via user interface 305. The warning notification may be generated in a particular format that depends on how the DNS query originated. As an example, if the DNS query originated from a browser application, the warning notification may be generated as a Hypertext Markup Protocol (HTML) page in the browser application. As another example, if the DNS query originated from a particular application, the warning notification may be generated as an in-application notification from the operating system (OS), if the particular application is signed up or enabled for in-application notifications from the OS. As yet another example, the warning notification may be generated as an OS notification.

A determination may be made as to whether the user has selected to proceed (block 550). If the user has not selected to proceed (block 550—NO), the DNS query may not be resolved (block 560). If the user has selected to proceed (block 550—YES), the DNS server may be instructed to proceed with resolving the DNS query (block 570). For example, in some situations, the user may recognize the warning as a false positive and may determine that the identified malicious URL does not pose a security risk. Alternatively, a user may be willing to risk the security of UE device 110. In such situations, security application 300 may instruct DNS server 150 to proceed with resolving the URL and DNS server 150 may return an IP address associated with the URL to UE device 110.

Figure 6:
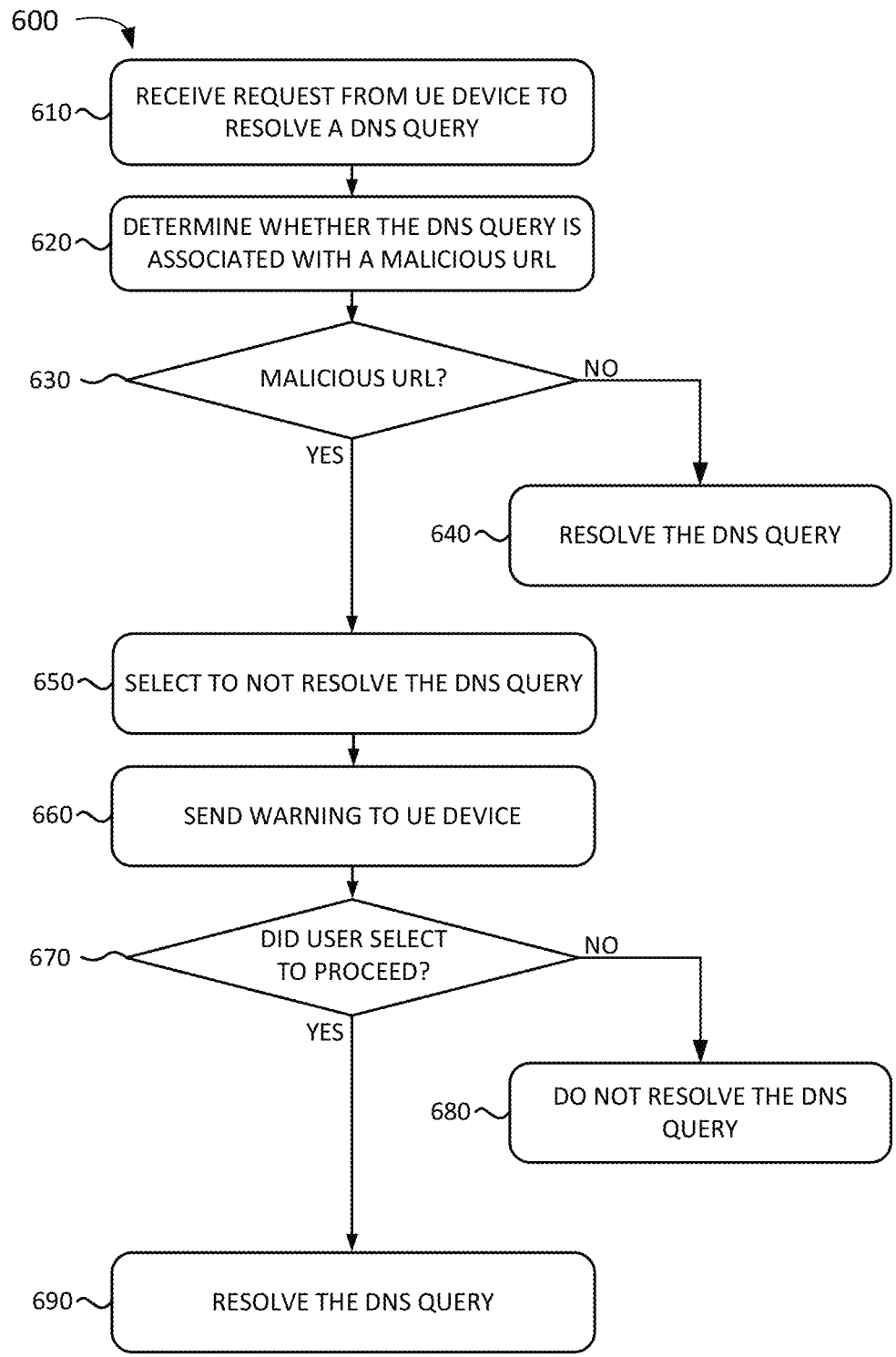
FIG. 6 is a flowchart of another process for handling DNS queries according to an implementation described herein.

FIG. 6 is a flowchart 600 of a second process for handling DNS queries according to an implementation described herein. In some implementations, the process of FIG. 6 may be performed by DNS server 150. In other implementations, some or all of the process of FIG. 6 may be performed by another device or a group of devices separate from DNS server 150.

The process of flowchart 600 may include receiving a request from a UE device 110 to resolve a DNS query (block 610). For example, DNS server 150 may receive a DNS query from UE device 110, CPE controller 134, and/or security device 136. The DNS query may include a URL for which an IP address is being requested.

A determination may be made as to whether the DNS query is associated with a malicious URL (block 620). For example, safe browsing engine 430 may access malicious URL DB 440 to determine whether the URL associated with the DNS query is included as an identified malicious URL in malicious URL DB 440. Furthermore, safe browsing engine 430 may provide the URL as an input to malicious URL ML model 450 and determine whether malicious URL ML model 450 classifies the URL as a malicious URL.

If the URL is not identified as a malicious URL (block 630—NO), DNS server 150 may resolve the DNS query by identifying an IP address for the URL and providing the identified IP address to UE device 110 (block 640). If the URL is identified as a malicious URL (block 630—YES), a selection may be made to not resolve the DNS query (block 650), and a warning may be sent to the UE device (block 660). After the warning is sent, a determination may be made as to whether the user selected to proceed with resolving the DNS query (block 670). If a request is received from UE device 110 not to proceed, or if a request is not received within a predetermined time period (block 670—NO), the DNS may not resolve the DNS query by not sending an IP address associated with the identified malicious URL to UE device 110 (block 680). If the user selects to proceed anyway to resolve the DNS query (block 670—YES), DNS server 150 may resolve the DNS query (block 690). For example, DNS server 150 may identify an IP address associated with the URL and may send the identified IP address to UE device 110. In some implementations, for particular types of malicious URLs, a user may not be provided with the option to proceed and the DNS query may be rejected.

Figure 7:
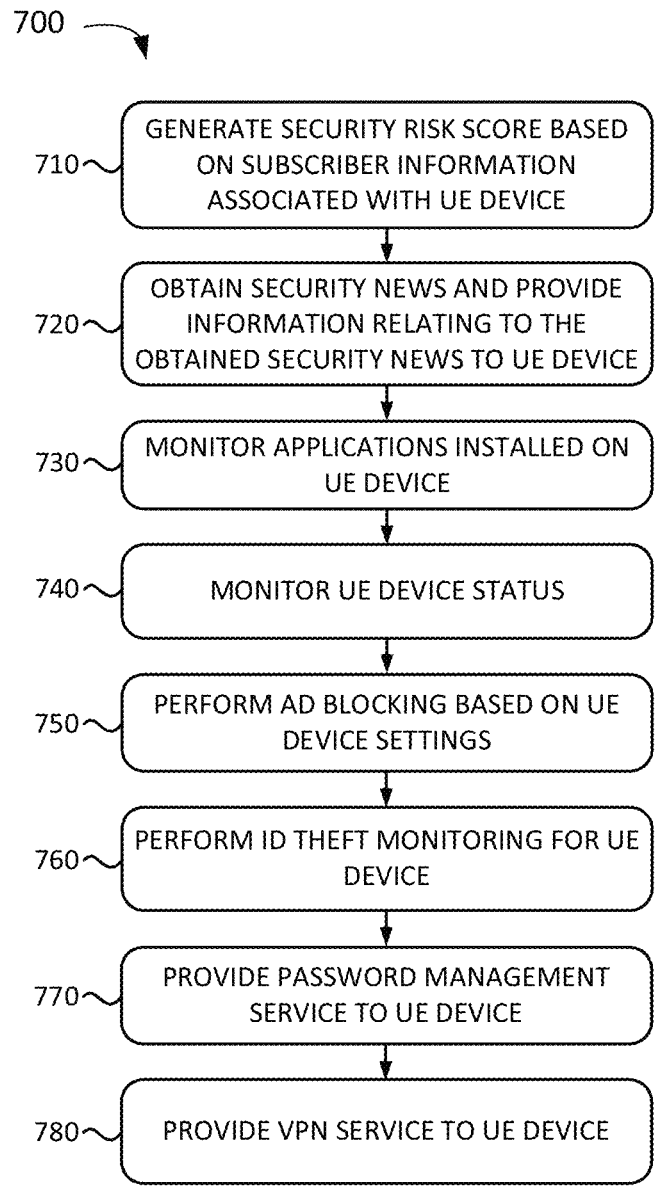
FIG. 7 is a flowchart of a process for performing security functions according to an implementation described herein.

FIG. 7 is a flowchart 700 of a process for performing security functions according to an implementation described herein. In some implementations, the process of FIG. 7 may be performed by security application running on UE device 110, CPE controller 134, or security device 136. In other implementations, some or all of the process of FIG. 7 may be performed by another device or a group of devices separate from UE device 110, CPE controller 134, or security device 136, such as, for example, security system 160. While the blocks of FIG. 7 are illustrated in a particular order, the blocks of FIG. 7 may be performed in any order, in parallel, and/or asynchronously with respect to each other.

The process of flowchart 700 may include generating a security score based on subscriber information associated with a user (block 710). For example, security application 300 may obtain, with the user's permission, demographic information for the user of UE device 110, browsing history information for the user, application use history associated with the user, and/or other types of security related information and may generate a security risk score for the user based on the obtained information.

The process of flowchart 700 may further include obtaining security news and providing information relating to the obtained security news to UE device 110 (block 720). For example, security application 300 may receive published news releases collected by security system 160 and may provide the news releases to the user via user interface 305, security application 300 may further provide a recommendation to the user to take a particular action based on a particular security news item, such as to change a particular password, to activate identity theft monitoring, and/or another type of action.

The process of flowchart 700 may further include monitoring applications installed on UE device 110 (block 730). For example, security application 300 may monitor applications installed and/or running on UE device 110 for violations of a security policy associated with UE device 110. For example, security application 300 may monitor all applications and access points on UE device 110, such as, for example, the contacts, photos, videos, documents, and/or other types of contents stored on UE device 110 that may be accessed by applications. Security application 300 may monitor and record when a particular application accesses a particular access point, when a particular application selects to access content, or send information to, another device across a network, and/or may keep a list of all IP addresses to which a particular application has sent a request.

The process of flowchart 700 may further include monitoring a status of UE device 110 and the account associated with UE device 110 (block 740). Security application 300 may monitor an operating system installed on UE device 110 for violations of the security policy. For example, security application 300 may monitor whether UE device 110 has been updated with all available updates, whether UE device 110 has been rooted or jailbroken, and/or may monitor for other types of security risks associated with the operating system of UE device 110. Furthermore, security application 300 may perform account monitoring for other UE devices 110 associated with the user's account/subscription and may report security events associated with the other UE devices 110 to a designated account manager UE device 110 associated with the user's account/subscription.

The process of flowchart 700 may further include performing advertisement blocking based on UE device 110 settings (block 750). For example, security application 300 may provide to DNS server 150 one or more advertisement blocking settings selected by a user of UE device 110 and DNS server 150 may perform advertisement blocking on DNS queries received from UE device 110 based on the received advertisement blocking settings.

The process of flowchart 700 may further include performing identity theft monitoring for UE device 110 (block 760). For example, security application 300 may be configured to interface and/or communicate with a device associate with an identity theft monitoring service for the user of UE device 110. The process of flowchart 700 may further include providing a password management service to UE device 110 (block 770). For example, security application 300 may manage passwords associated with the user of UE device 110. For example, security application 300 may store passwords associated with the user in an encrypted format and may provide a particular stored password to the user when the user is logging into a particular account. The process of flowchart 700 may further include providing a VPN service to UE device 110 (block 780). For example, security application 300 may provide a VPN service for the user of UE device 110. For example, a user may select to activate a VPN service and security application 300 may establish a VPN connection to security system 160.

Figure 8:
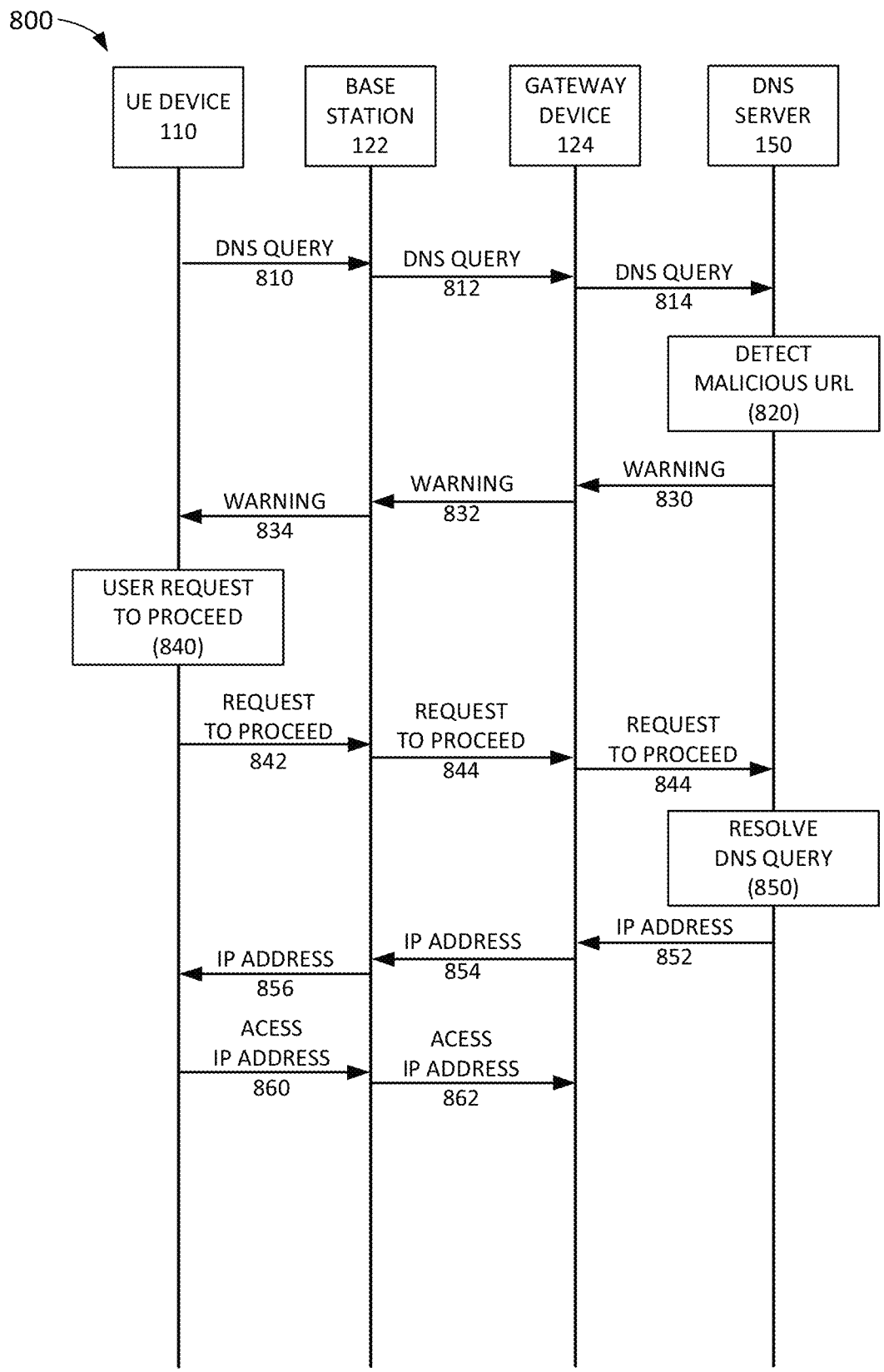
FIG. 8 is an exemplary signal flow for processing DNS queries according to an implementation described herein.

FIG. 8 is an exemplary signal flow 800 for processing DNS queries according to an implementation described herein. Signal flow 800 may include UE device 110 sending a DNS query for a URL to DNS server 150 via base station 122 and gateway device 124 (signals 810, 812, and 814). As an example, UE device 110 may send the DNS query in response to a user clicking on a link in a page displayed by a browser application, a link included in an email or text message, etc. As another example, an application running on UE device 110 may activate a link associated with the URL without the user explicitly clicking on the link.

In other implementations, the DNS query sent by UE device 110 may be intercepted by security application 300 running on gateway device 124. Gateway device 124 may intercept the DNS request from UE device 110 and may determine that UE device 110 is associated with an account/subscription that includes a DNS monitoring service. In response, gateway device 124 may send the intercepted DNS request to DNS server 150 instead of a default DNS server (not shown in FIG. 8).

DNS server 150 may detect a malicious URL by determining that the URL associated with the DNS query corresponds to a malicious URL (block 820). As an example, DNS server 150 may access malicious URL DB 440 and determine that the URL is identified in malicious URL DB 440 as a malicious URL. As another example, DNS server 150 may provide the URL as an input into malicious URL ML model 450 and the malicious URL ML model 450 may classify the URL as a malicious URL. In response, DNS server 150 may send a warning to UE device 110, via gateway device 124 and base station 122, indicating that the selected link is associated with an identified malicious URL (signals 830, 832, and 834). In implementations in which the DNS query was intercepted by security application 300 running on gateway device 124, gateway device 124 may receive the warning for UE device 110 from DNS server 150 and may forward the warning to UE device 110.

In some implementations, the warning may include information associated with the identified malicious link, such as the type of malicious activity associated with the malicious link, a degree of severity associated with the malicious link, etc. The warning may be displayed in a particular format based on how the DNS query was generated, such as an HTML, page in a browser application, a notification in a particular application, and/or as a notification generated by the OS of UE device 110.

In some situations, the user may select to proceed with resolving the DNS query (block 840). For example, the user may recognize the identified malicious URL as a false positive. UE device 110 may forward the request to proceed with the DNS query to DNS server 150 via base station 122 and gateway device 124 (signals 842, 844, and 846). In response, DNS server 150 may resolve the DNS query by identifying an IP address associated with the URL (block 850) and forwarding the identified IP address to UE device 110 via gateway device 124 and base station 122 (signals 852, 854, and 856). UE device 110 may then access a website associated with the IP address via base station 122 and gateway device 124 (signals 860 and 862).

Figure 9:
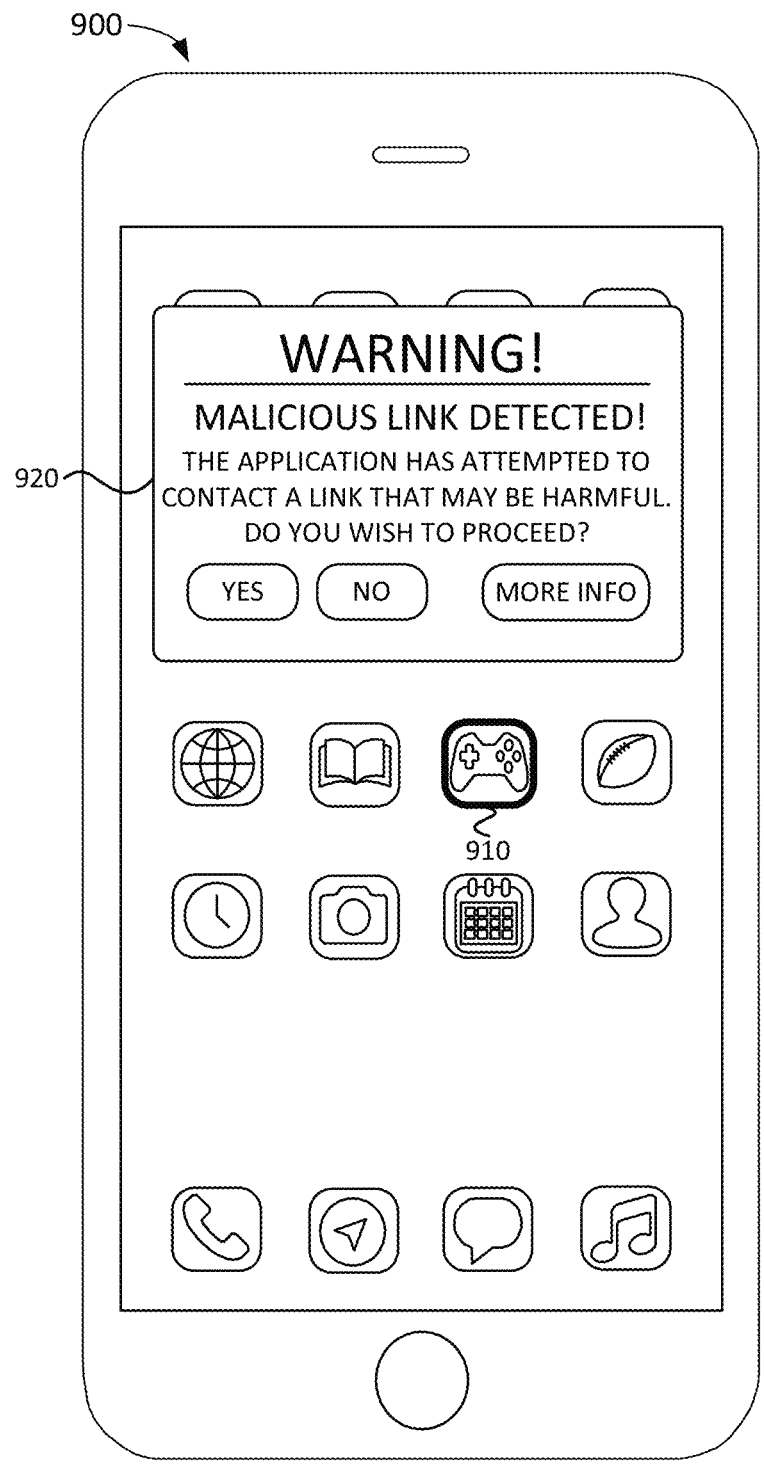
FIG. 9 is a diagram of an exemplary user interface according to an implementation described herein.

FIG. 9 is a diagram of a first exemplary user interface 900 according to an implementation described herein. As shown in FIG. 9, user interface 900, displayed on UE device 110, may include a highlighted application icon 910 after a user selects to launch an application. For example, in FIG. 9, the user has clicked on a game application icon 910 for a game the user has downloaded. In response, a warning message 920 displayed by security application 300 in response to a detected malicious URL associated with a DNS query generated by the game application when the user lunched the game application. Warning message 920 may give the user the option to proceed, to not proceed, or to request more information. If the user requests more information, security application 300 may, for example, provide information identifying the type of malicious activity associated with the identified malicious URL.

Figure 10:
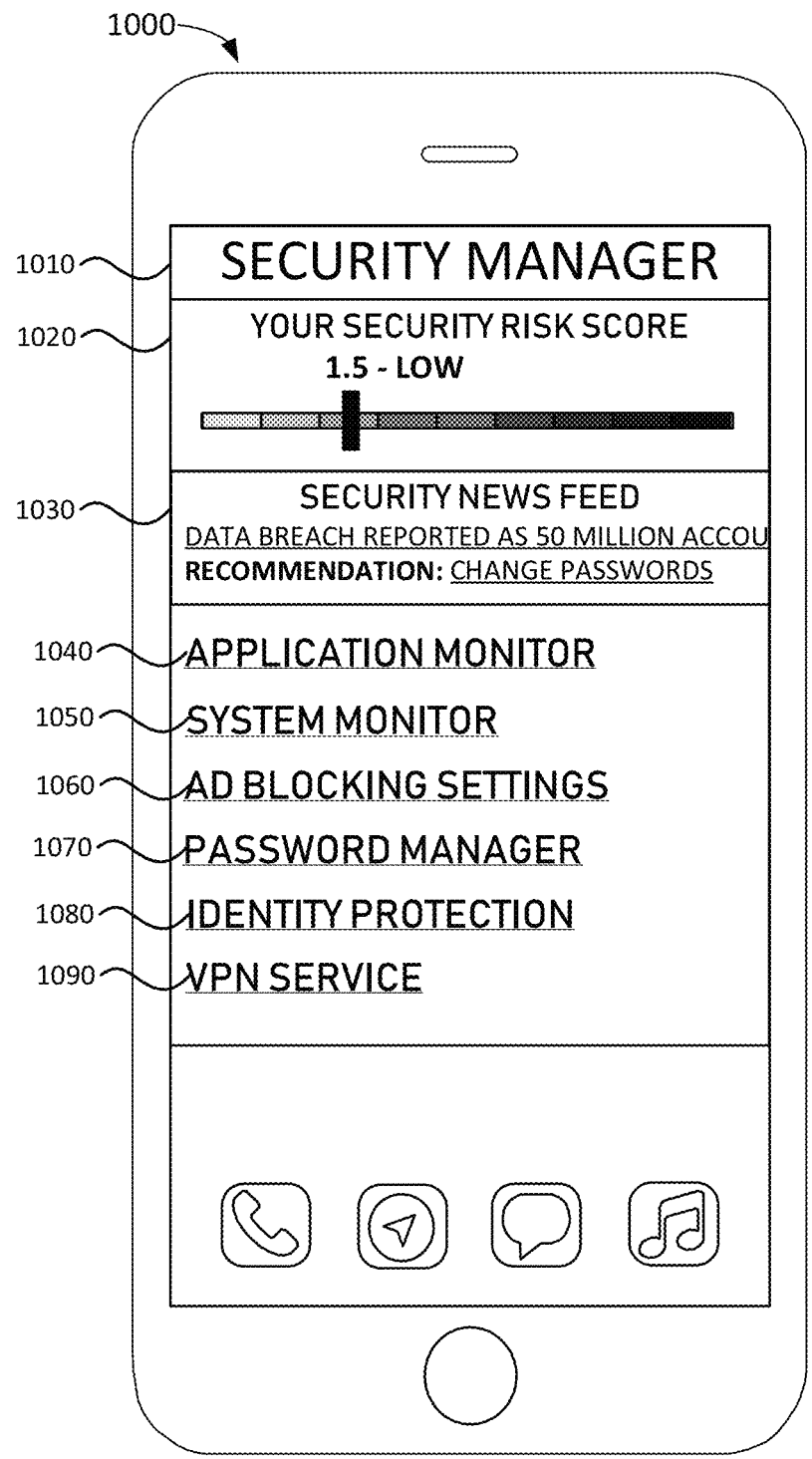
FIG. 10 is a diagram of another exemplary user interface according to an implementation described herein.

FIG. 10 is a diagram of a second exemplary user interface 1000 according to an implementation described herein. As shown in FIG. 10, user interface 1000, displayed on UE device 110, may include a dashboard 1010 generated when a user launched, or switches to, security application 300. Dashboard 1010 may include a security score indicator 1020, a security news feed 1030, an application monitor selection object 1040, a system monitor selection object 1050, an ad blocking settings selection object 1060, a password manager selection object 1070, an identity protection selection object 1080, and a VPN service selection object 1090.

Security score indicator 1020 may be generated by risk score manager 310 and may display a security risk score associated with the user of UE device 110. Security news feed 1020 may be generated by security news manager 320 and may display a feed of security news along with a recommendation to the user based on the security news. Application monitor selection object 1040 may enable the user to select to display information provided by application monitor 330. System monitor selection object 1050 may enable the user to display information provided by system monitor 370. Ad blocking settings selection object 1060 may enable a user to select ad blocking settings available via ad blocking manager 350. Password manager selection object 1070 may enable the user to activate password manager 380. Identity protection selection object 1080 may enable the user to activate ID protection manager 360. VPN service selection object 1090 may enable the user to activate VPN manager 390.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 5, 6, and 7, and series of signal flows have been described with respect to FIG. 8, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    receiving, by a computer device, a request from a user equipment (UE) device to resolve a Domain Name System (DNS) query for a Uniform Resource Locator (URL);
    determining, by the computer device, that the UE device has selected an advertisement blocking setting, wherein the advertisement blocking setting identifies a particular type of advertisement to block for the UE device;
    determining, by the computer device, that the URL is associated with the particular type of advertisement, wherein determining that the URL is associated with the particular type of advertisement includes:
        providing the URL as an input to a machine learning model trained to classify any inputted URL as an advertisement URL or a non-advertisement URL; and
    selecting, by the computer device, to not resolve the DNS query in response to determining that the URL is associated with the particular type of advertisement and that the UE device has selected the advertisement blocking setting.

2. The method of claim 1, wherein determining that the URL is associated with the particular type of advertisement further includes:
    accessing an advertisement URL database that stores a list of identified advertisement URLs.

3. The method of claim 1, further comprising:
    generating an input feature vector for the machine learning model from the URL based on one or more of lexical features associated with the URL, location features associated with the URL, or UE device use features associated with the URL.

4. The method of claim 3, wherein the lexical features associated with the URL include at least one of:
    a length of the URL,
    a length of a hostname included in the URL,
    a length of a pathname included in the URL,
    a number of period characters included in the URL,
    a URL parameter included in the URL,
    a user agent associated with the URL, or
    a header pattern associated with the URL.

5. The method of claim 3, wherein the location features associated with the URL include at least one of:
    an autonomous system associated with the URL,
    a country associated with the URL, or
    an entity that registered a domain associated with the URL.

6. The method of claim 3, wherein the UE device use features associated with the URL include at least one of:
    an application associated with the URL,
    an application type associated with the URL, or
    an operating system associated with the URL.

7. The method of claim 1, wherein the particular type of advertisement includes at least one of:
   a pop-up advertisement,
   an audio advertisement, or
   a video advertisement.

8. The method of claim 1, wherein determining that the UE device has selected the advertisement blocking setting includes at least one of:
   determining a website or domain for which to block advertisements for the UE device;
   determining a category of product or service for which to block advertisements for the UE device; or
   determining a time period during which to block advertisements for the UE device.

9. The method of claim 1, further comprising:
   receiving a request from the UE device to proceed with resolving the DNS query;
   resolving the DNS query to identify an Internet Protocol (IP) address associated with URL, in response to receiving the request from the UE device to proceed with resolving the DNS query; and
   providing the identified IP address to the UE device.

10. A device comprising:
    a memory configured to store instructions; and
    a processor configured to execute the instructions to:
       receive a request from a user equipment (UE) device to resolve a Domain Name System (DNS) query for a Uniform Resource Locator (URL);
       determine that the UE device has selected an advertisement blocking setting, wherein the advertisement blocking setting identifies a particular type of advertisement to block for the UE device;
       determine that the URL is associated with the particular type of advertisement, wherein, when determining that the URL is associated with the particular type of advertisement, the processor is further configured to:
          provide the URL as an input to a machine learning model trained to classify any inputted URL as an advertisement URL or a non-advertisement URL; and
       select to not resolve the DNS query in response to determining that the URL is associated with an advertisement and that the UE device has selected the particular type of advertisement blocking setting.

11. The device of claim 10, wherein, when determining that the URL is associated with the particular type of advertisement, the processor is further configured to:
    access an advertisement URL database that stores a list of identified advertisement URLs.

12. The device of claim 10, wherein the processor is further configured to: generate an input feature vector for the machine learning model from the URL based on one or more of lexical features associated with the URL, location features associated with the URL, and UE device use features associated with the URL.

13. The device of claim 10, wherein the particular type of advertisement includes at least one of:
    a pop-up advertisement,
    an audio advertisement, or
    a video advertisement.

14. The device of claim 10, wherein, when determining that the UE device has selected the advertisement blocking setting, the processor is further configured to at least one of:
    determine a website or domain for which to block advertisements for the UE device;
    determine a category of product or service for which to block advertisements for the UE device; or
    determine a time period during which to block advertisements for the UE device.

15. The device of claim 10, wherein the processor is further configured to:
    receive a request from the UE device to proceed with resolving the DNS query;
    resolve the DNS query to identify an Internet Protocol (IP) address associated with URL, in response to receiving the request from the UE device to proceed with resolving the DNS query; and
    provide the identified IP address to the UE device.

16. A device comprising:
    a memory configured to store instructions; and
    a processor configured to execute the instructions to:
       provide an advertisement blocking setting, associated with the device, to a Domain Name System (DNS) managed by a provider that manages the device or that provides wireless communication service to the device, wherein the advertisement blocking setting specifies at least one of a website or domain for which to block advertisements, a category of product or service for which to block advertisements, or a time period during which to block advertisements;
       intercept a request to resolve a DNS query for a Uniform Resource Locator (URL);
       send the DNS query request to a DNS server; and
       receive, from the DNS server, an indication that the DNS query has not been resolved based on the provided advertisement blocking setting.

17. The device of claim 16, wherein the processor is further configured to:
    generate a security score for a user associated with the device, wherein the security score is based on demographic information associated with the user and a browsing history associated with the user.

18. The computer device of claim 16, wherein the device includes a gateway device, wherein the gateway device is configured to:
    receive the request to resolve the DNS query for the URL from a user equipment (UE) device;
    determine that the UE device is subscribed to a DNS monitoring service; and
    send the DNS query request to the DNS server, in response to determining that the UE device is subscribed to the DNS monitoring service.

19. The computer device of claim 16, wherein the advertisement blocking setting further specifies to block at least one of:
    a pop-up advertisement,
    an audio advertisement, or
    a video advertisement.

20. The computer device of claim 16, wherein the advertisement blocking setting further specifies to block advertisements when the device is in a particular location.

* * * * *